United States Patent [19]
Hashi

[11] Patent Number: 5,597,147
[45] Date of Patent: Jan. 28, 1997

[54] ARTICULATION MECHANISM AND A UNIVERSAL ARM MEANS APPLYING THE MECHANISM

[75] Inventor: Masahiko Hashi, Koshigaya, Japan

[73] Assignee: Transuport Corporation, Japan

[21] Appl. No.: 399,903

[22] Filed: Mar. 7, 1995

[30] Foreign Application Priority Data

Mar. 8, 1994 [JP] Japan ................................. 6-064466
May 26, 1994 [JP] Japan ................................. 6-136415
Aug. 29, 1994 [JP] Japan ................................. 6-227313

[51] Int. Cl.$^6$ .............................. F16M 11/12; F16F 9/44
[52] U.S. Cl. ...................... 248/280.11; 16/319; 16/349; 188/298; 188/299; 188/300; 188/310; 188/316; 188/319; 248/278.1; 248/284.1; 248/921
[58] Field of Search ........................... 248/278.1, 280.11, 248/284.1, 921; 16/57, 58, 319, 349, 352; 188/298, 299, 300, 306, 307, 310, 316, 318, 319; 74/469

[56] References Cited

U.S. PATENT DOCUMENTS

| | | | |
|---|---|---|---|
| 2,630,887 | 3/1953 | Paquin | 188/300 |
| 2,717,138 | 9/1955 | Sheehan | 188/310 X |
| 3,193,674 | 7/1965 | Fleming | 248/278.1 X |
| 4,625,933 | 12/1986 | Luciano et al. | 188/298 X |
| 4,863,133 | 9/1989 | Bonnell | 248/280.11 |

FOREIGN PATENT DOCUMENTS 1-288600  11/1989  Japan .
1-164085  11/1989  Japan .
2-74188   6/1990  Japan .

*Primary Examiner*—Allan D. Herrmann
*Attorney, Agent, or Firm*— Hayes, Soloway, Hennessey, Grossman & Hage, P.C.

[57] ABSTRACT

An articulation mechanism which can change a hinge angle freely, even if a considerable large load is attached to the tip end of a movable arm, and which can hold the hinge angle rigidly, when it is once stopped, is provided. The articulation mechanism (1) has a fluid hermetically sealing space (25) in which a non-compressive fluid or a compressive fluid compressed to a predetermined pressure is hermetically sealed, so that even if there may be energizing force, relative rotation between rotary members is prevented by a predetermined force. When the fluid hermetically sealing space is released by opening and closing valve (21), as a result of the energizing force such as may be generated, for example from load or spring, the fluid can transfer, resulting in relative rotations of the rotary members. When the opening and closing valve (21) is in closed state, the fluid hermetically sealed in the sealing space (25) does not permit a change in distance between each of local portions of the respective rotary members. As a result, relative rotations of the rotary members are prevented.

9 Claims, 12 Drawing Sheets

ARTICULATION MECHANISM AND A UNIVERSAL ARM MEANS APPLYING THE MECHANISM

APPLIED FIELD

The present invention relates to a novel articulation mechanism which is applied to a hinging part, capable of surely securing weighty load at any position, and further can be freely manupilated, and to a universal arm means which applies the articulation mechanism.

PRIOR ART

Conventionally, movable arm means having been applied to such as movable lighting apparatus (such as Z-light), movable television sets which are used by disposing at working spaces have utilized articulation mechanism, and by which the lighting apparatus and/or the television set are attached to the tip end of the movable arm means so that they can be freely moved. provided An articulation mechanism applied to the afore-mentioned apparatus comprises, in general, spring means provided at hinging means so that elestic power of the spring means may support the weighty load added thereon and/or said hinging means giving predetermined friction so as to be able to support the weighty load. Further, there has been developed other articulation means which has another construction in which all movable arms are secured themselves to the hinging part immovably with predetermined friction.

PROBLEMS TO BE SOLVED BY THE INVENTION

In an office having merely limited spaces it is desired that any narrow space, even the upper space of the office, should be utilized. Therefore, a weighty television set, ascreen of a CRT and book shelves are disposed at any spaces capable of being utilized. Accordingly, when they are not being in use, it is desired to move them from thier workingpositions to spaces such as wall sides, near the ceiling that have not been utilized effectively heretofore. In these cases with the conventional movable arm means, it is hard tosupport things weightier than a certain predetermined load, and even if it can support the weighter, very complicate manupilation is necessary to operate hinging part(s) of the movable arm means.

It is an object of the present invention to provide novel articulation mechanism which can freely change an angle of an articulating arm even if extremely weighty thing is attached to the tip portion of the movable arm, and once the movable arm is stopped, it can hold the angle of the articulating arm rigidly. In addition, it is another object of the present invention to provide a universal arm means which can shift a weighty thing to any position by applying the articulation mechanism.

MEANS FOR SOLVING THE PROBEMS

The articulation mechanism according to the present invention characterized by comprising two rotary members rotating relatively, at least two Local portions of each of the rotary members which change relative distances in response to the relative rotations of said two rotary members, a first member and a second member each of which is connected to the local portions respectively, and a fluid sealing space formed between the first member and the second member, wherein the sealing condition of the fluid sealing space can be released with a predetermined opening and closing means.

In addition, the universal arm means according to the present invention has a plurality of articulation mechanism claimed in claim 1 of the present invention disposed among a plurality of arms, and a plurality of the opening and closing means of the articulation mechanism can be opened and closed almost simultaneously with only one external switch means.

OPERATION

In the fluid hermetically sealing space of the present articulation mechanism, incompressible fluid or compressive fluid compressed with a predermined pressure is filled, so that even if there exists energizing power, relative rotations of the rotary members are prevented by a predetermined force. When the hermetically sealing condition is released by the opening and closing means, the fluid can flow freely in response to suchenergizing force caused by loading, elastic force of spring means etc., which results in that the rotary members can begin relative rotations. On the other hand if the opening and the closing means is closed, the fluid hermetically filled in the fluid sealing space can not flow, so that distance between each of the local portions of therespective rotary members never changes. Thus, the rotary members are prevented themselves from rotating relatively.

The universal arm means according to the present invention is equipped with a plurality of articulation mechanism and a plurality of arm means (among a plurality of arm means). (Each of the articulation mechanism is disposed between each of ajacent arms). The opening and closing means of these articulation mechanism are operated simultaneously by external switching means, accordingly, the universal arm means can be freely moved at "on" condition of the external switching means and at "off" condition of the switching means the universal arm means can be stopped stationary.

DETAILED DESCRIPTION OF THE INVENTION

Figures 1, 2:
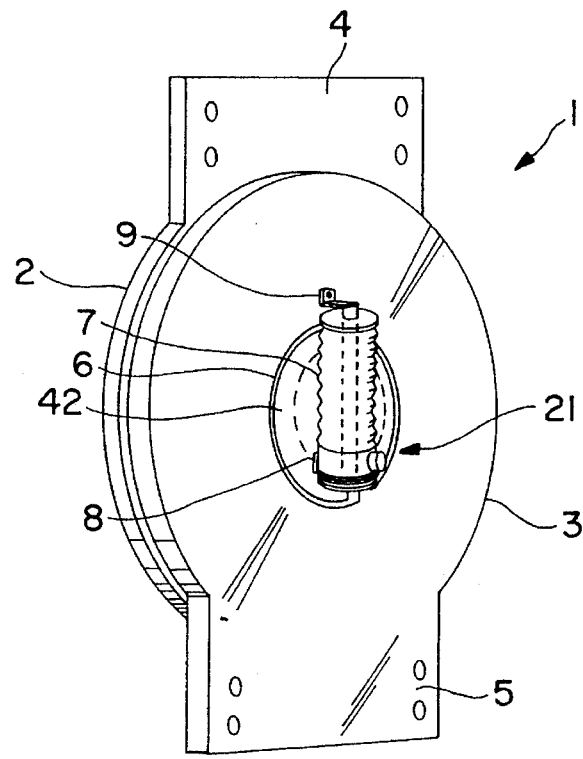
FIG. 1 is a perspective view of articulation mechanism of the present invention.
FIG. 2 is an exploded perspective view of the articulation mechanism of the present invention.

With reference to FIGS. 1 and 2 hereinafter explanation will be given regarding an articulation mechanism of the present invention. The articulation mechanism 1 comprises at least a first rotary member 2 and a second rotary member 3. To the first rotary member 2 there is secured an arm 4 and to the second rotary member 3 an arm 5 is secured. A central axis 6 of the first rotary member 2 is inserted through predetermined bearing means into a central hole 7 bored to the second rotary member 3, by means of predetermined bearing means a central axis 6 of the first rotary member 2 is fitted with a central hole 7 bored in the second rotary member 3, and A is screwedly inserted into the bore 7 from side of the second rotary member 3, ( a cap plate 42 is threadedly inserted into the bore 7 from side of the second rotary member 3), and it is secured to the first rotary member 2 integrally so that it may be a portion thereof and can not rotate by securing means such as adhesive, welding, bolting means etc.

Figure 3:
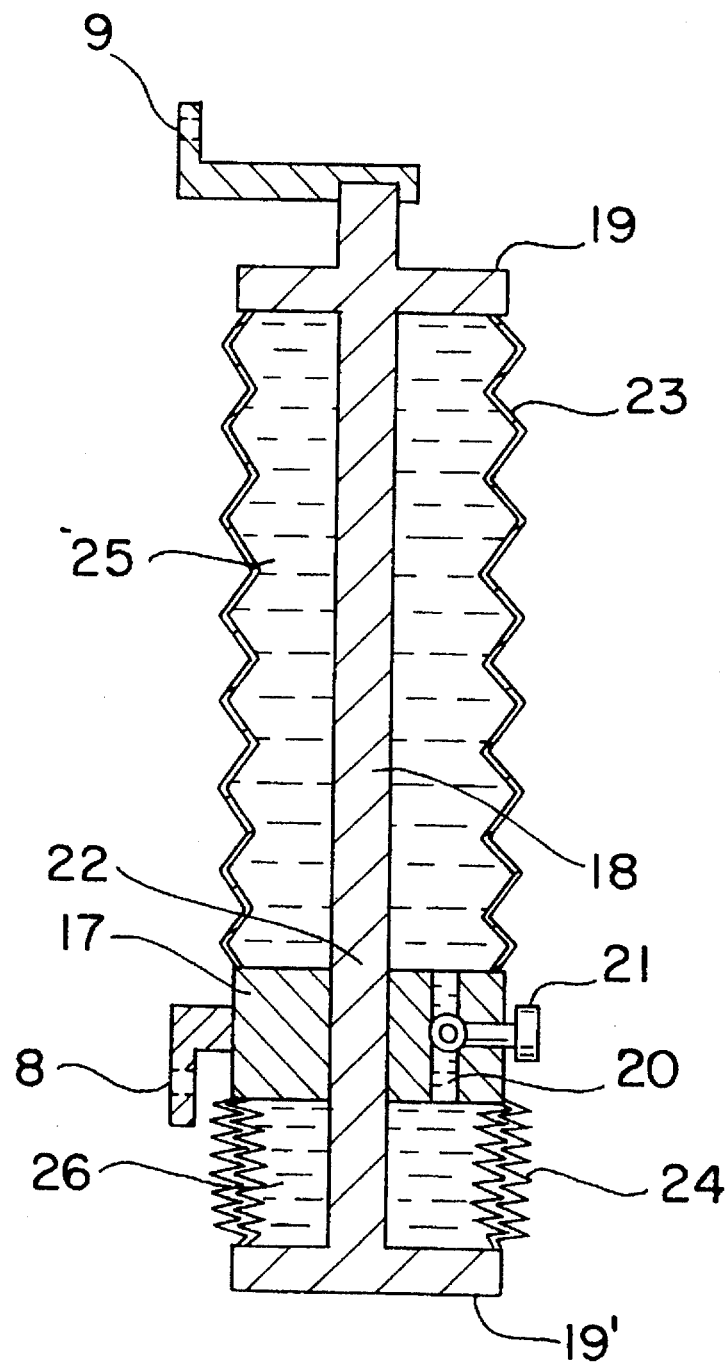
FIG. 3 is an enlarged sectional view of a controlling member.
Figure 4:
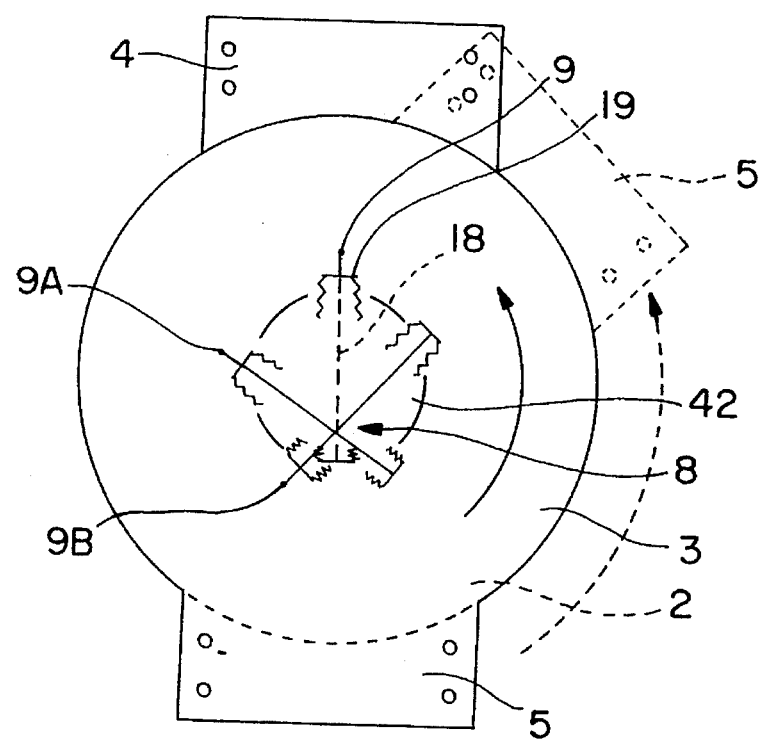
FIG. 4 is a view showing an outline of operation of the articulation mechanism of the present invention.

Therefore, both of them (the first and the second rotary members) can make relative rotations freely. In addition, between a projecting piece 15 of the first rotary member 2 and a projecting piece 27 of the second rotary memebr 3 there is provided a spring means 28 as an energizing means, and always it energizes the both rotary members with appropriate force so that they may make relative rotations. Of course, this spring means can be such as gas spring etc., and at any position it may be disposed. At a predetermined eccentric position (that is, local position) on one side of the first rotary memebr 2, as shown in FIGS. 2, 3 and 4, a disk 17 is pivotally attached by such attaching means as a hinge 8 etc. thereon. In this disk 17 there is bored a hole 22 in which a rod 18 is slidably fitted, and at the upper and the lower ends of the rod 18 end disks 19 and 19' are secured respectively. In this embodiment the second member comprises the rod 18 and the end disks 19, 19', and at the tip end of at least one of the end disks is pivotally attached by such attaching means as a hinge 9 etc.to the predetermined position (i.e., the local position) of the second rotary member 3.

Further, in the disk 17 there is provided a communicating passage 20 through which a first partitioning chamber 25 and a second partitioning chamber 26 (each of which is described hereinafter) can communicate with each other. At a predetermined position in the communicating passage 20 between the first partitioning chamber 25 and the second partitioning chamber 26 there is equipped an opening and closing valve 21 as opening and closing means. The opening and closing valve 21 is, preferably, such a type of a valve which is being closed at its normal state with energizing means such as spring means etc. It is also preferable to make the valve 21 so that it can be opened by pressing and/or rotating a manupilating member extending to upper portion to communicate the inside of the first partitioning chamber 25 with that of the second partitioning chamber 26. Here, the communicating passage 20 is described a part of the disk 17, however, the persons skilled in the art can easily understand that the communicating passage 20 may be, other other than the disk 17, a narrow pipe extending to the outside thereof. Further, it is also possible to connect the both end disks 19 and 19' with each other by a narrow pipe to open and close the valve 21. As the valve 21, for example, an electromagnetic valve which is at its normal state being closed may be applied. Means for manually manupilating the valve a push button 16 or the like can be additionally mounted on the valve. Here, the reference numbers 29 and 43 disignate respectively a groove and a guiding piece for controlling each of rotation ranges of the first rotary member and the second rotary member (FIG. 2).

Between the disk 17 and the end disk 19 there is provided a bag-like vessel which can change its length in its axial direction, for example, such as bellows 23, to form the first partitioning chamber 25 as a space for hermetically sealing a fluid to be used, and same as the afore-mentioned, between the disk 17 and the end disk 19' there is provided a bag-like vessel, bellows 24, nearly same as the afore-mentioned bellows 23, to form the second partitioning chamber 26. In each of those partitioning chambers 25 and 26 non-compressive fluid, such as liquid or compressive fluid compressed by a predetermined pressure, for example, gaseous material as air or the like is hermetically sealed.

Cross sectioned shapes of these bellows 23 and 24 are approximately cyrindrical, however, of course, it is possible to make them rectangular shpes. If it is formed that the total volume of the first partitioning chamber 25 and the second partitioning chamber 26 does not change, when the bellows 23 and 24 are expanded or contracted, movements of the rotary members can move smoothly. In the articulation mechanism constructed as afore-described the first partitioning chamber 25 is communicated with the second partitioning chamber 26 by operating the valve 21 as electromagnetic driving means or by operating it (the valve 21) manually. As a valve in the inside of the opening and closing valve means 21 a cock can be used and a spool valve also may be applied. Such a valve of which opening and closing force is hardly effected by intruding pressure applied onto the one side is suitable and preferable. Operation of the articulation mechanism according to the present invention is explained in detail with reference to FIG. 4. In FIG. 4 for the purpose of explaining the present mechanism the first rotary member 2 is stationary set and drawn in the back side (to the surface of the paper on which the drawings are made) and the second rotary member 3 is drawn at the front side so that rotation of the second rotary member 3 can be clearly understood. As shown in the drawings the first disk 17 is pivotally secured not to the center of the cap plate 42 but to an eccentric position with a hinge 8 or the like. Accordingly, the hinge 8 of the disk 17 does not shift and the disk 17 rotates around the eccentric position. Further, a neighbour portion of the end disk 19, the second member, is pivotally attached to the outer circumferential portion of the second rotary member 3 with a hinge 9, so that it rotates about the central point of the cap plate 42. Thus, when each of the first and the second rotary members rotates relatively, the hinge 9 moves to 9A and 9B, that is, the rod 18 penetrates the disk 17 and the end disk 19 approaches to the disk 17, while the end disk 19' separates from the disk 17. When strong rotating force is applied between these two rotary members, the rod 18 slidingly moves in the inside of the disk 17 to complete function of smoothly guiding the first and the second members, and also acts to change bending force to linearly working force.

In both the first partitioning chamber 25 and the second partitioning chamber 26 there is sealed a liquid having non-compressive property, and when the liquid is put to heavy load or urged by elastic force by the spring means 28, by shifting the liquid, the disk 17 and the end disk 19 and 19' consequently make relative movements. Accordingly, it is possible to operate the present articulation mechanism 1freely through an arms 4 and 5 by operating the external switching means 11 which will be explained hereinafter or by releasing the opening and closing valve 21 with the manupilating part. To stop operation of the articulation mechanism 1, the external switching means 11 is set to "off" state or to act the manupilating part such as a push button etc. manually. Then, the liquid is prevented from flowing between the two partitioning chambers, accordingly, the liquid is sealed in the first partitioning chamber 25 and the second partitioning chamber 26. As a result movement of a piston attached to one end of the rod 18 can be surely stopped. Therefore, even if strong bending force is applied to the arm 4 or 5, nearly the articulation mechanism 1 does not move.

Figure 5:
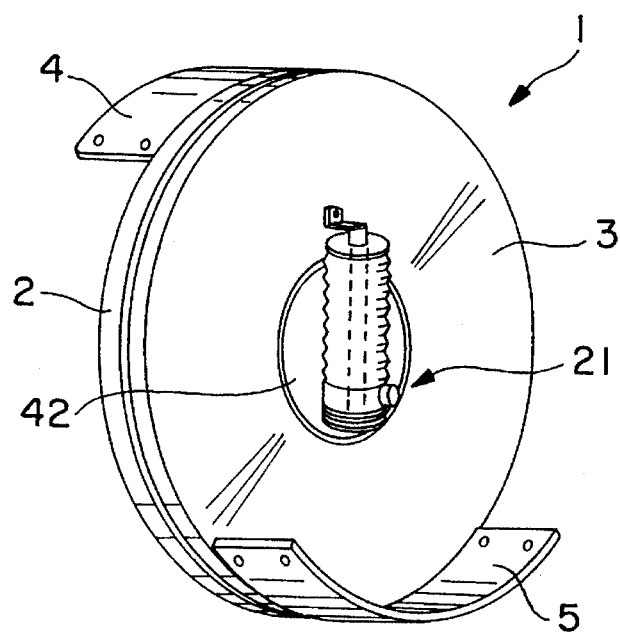
FIG. 5 is a perspective view of an articulation mechanism for horizontal rotation.

It is possible to seal gases such as air or the like hermetically by replacing with the liquid. In such a case if pressure of hermetically sealed gas is low, it is impossible to stop the movement of the piston surely, but in the case of highly pressured gas is sealed, shiftings of articulating portions of the articulation mechanism 1 can be stopped by basing on pressure balance, after closing the opening and closing valve 21, though there may be slight fluctuation. In this case it is advantageous that even if any impact, for example, sudden load etc. is applied to the articulating portion, pressure of the sealed gas acts as a gas spring and buffers the impact as damper means. With these functions the articulating portions, i.e., the arms can be prevented from being destroyed. The articulation mechanism according to the present invention may also be made to rotate horizontally. In this case as shown in FIG. 5, the arms 4 and 5 are vertically secured to the first rotary member 2 and the second rotary member 3. This articulation mechanism 1' is extremely effective to realize a universal arm means which will be explained hereinafter, and has a function to change direction of any weighty thing in the horizontal plane.

In FIGS. 6 to 9 there are shown the second embodiment of the present invention. In the second embodiment the articulation mechanism according to the present invention is applied not to a linear driving portion, but applied to a rotation driving portion.

Figure 6:
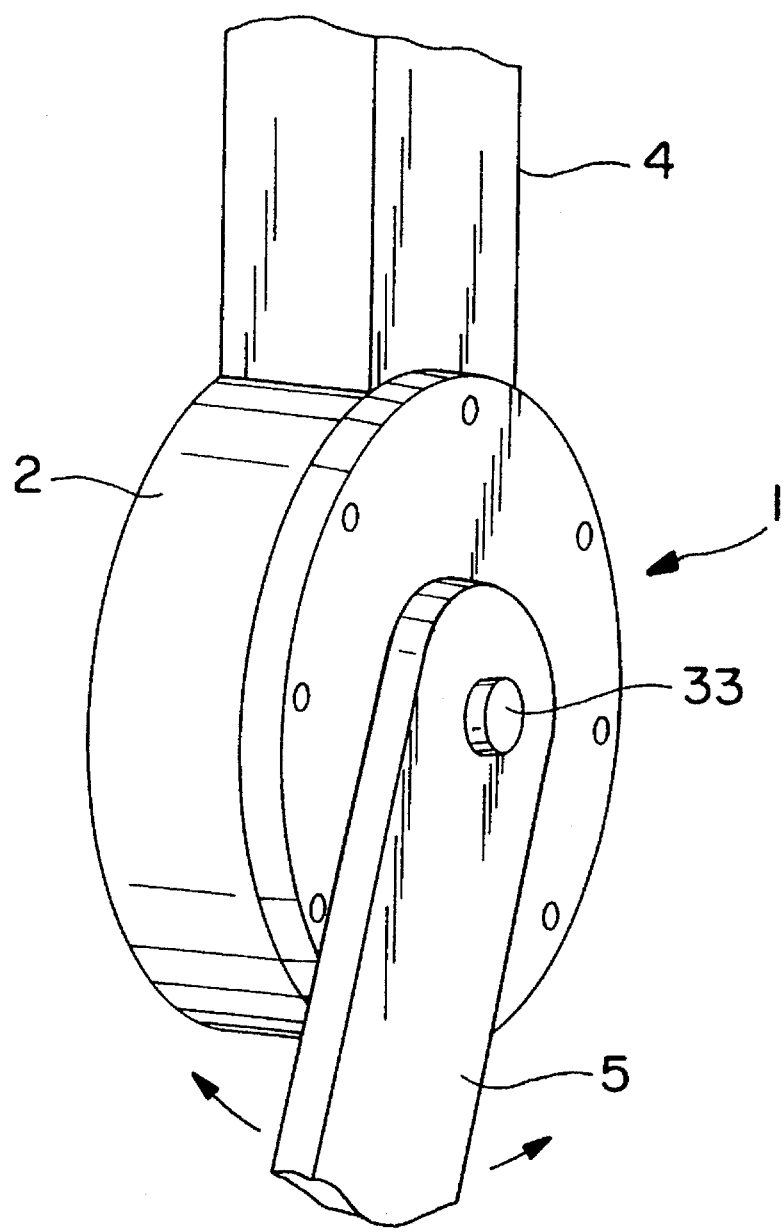
FIG. 6 is a perspective view of an articulation mechanism of the second embodiment of the present invention.
Figure 7:
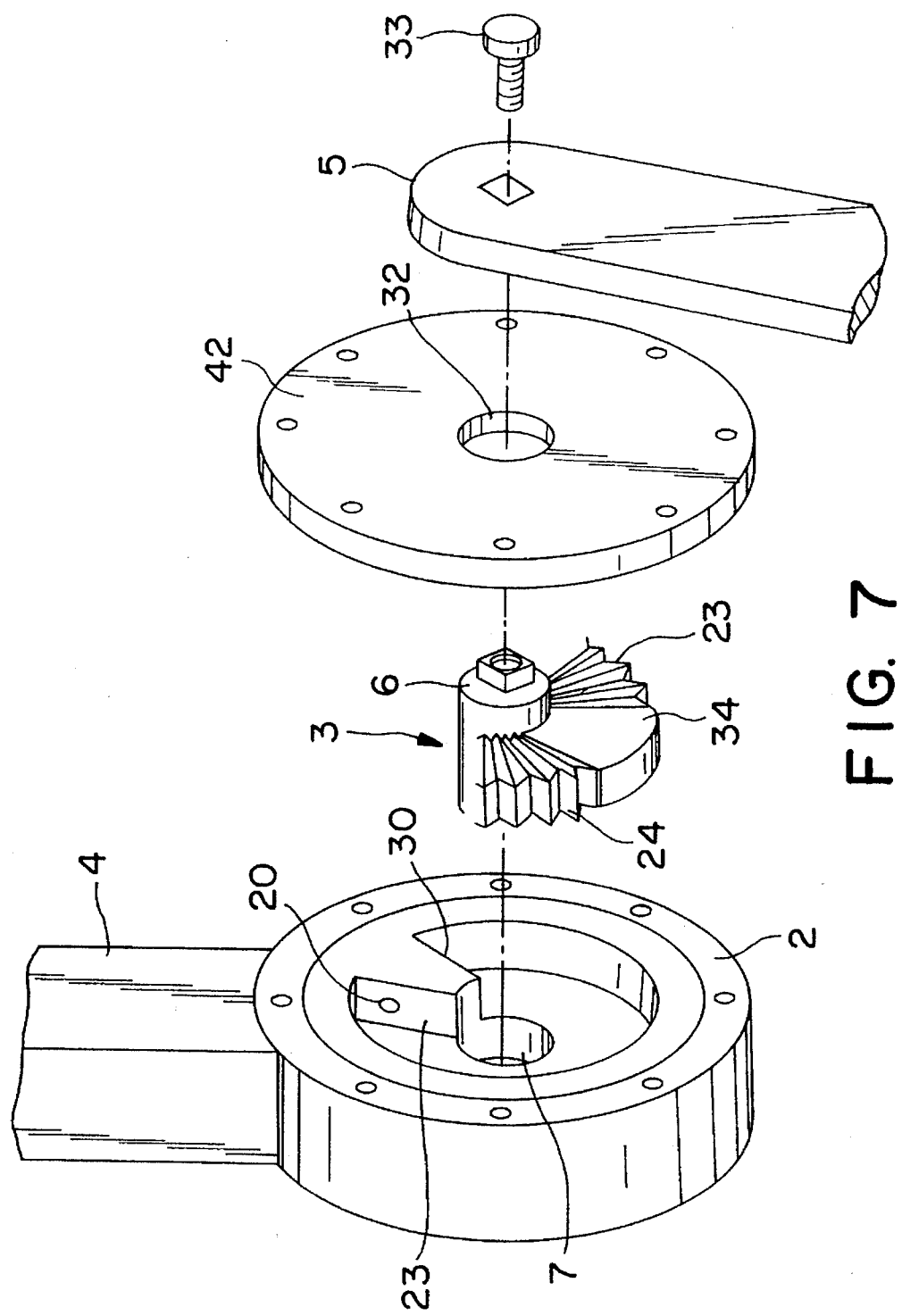
FIG. 7 is an exploded perspective view of the second embodiment of the present invention shown in FIG. 6.

Appearance of the second embodiment is shown in FIG. 6 and the inside thereof is shown in FIG. 7. As shown in those FIGS. 6 and 7, the second embodiment of the articulation mechanism 1' of the present invention comprises at least the first rotary member 2 and the second rotary member 3, and the arm 4 and the arm 5 are attached to the first rotary member 2 and the second rotary member 3 respectively, for example, with screw means 33. In the central bore 7 of the first rotary member 2 the central axis 6 of the second rotary member 3 is fixed through predetermined bearing means, and further, the central axis 6 of the second rotary member 3 is fixed through predetermined bearing means into a hole 32 of the cap plate 42 which is secured to the first rotary member 2 such as screw means. Both of the rotary members 2 and 3 can relatively rotate freely as shown in FIG. 6. In addition, not shown in the drawings, spring means as energizing means is provided between the first rotary member 2 and the second rotary member 3 so that they can be rotated relatively by appropriate energized force.

Figure 8:
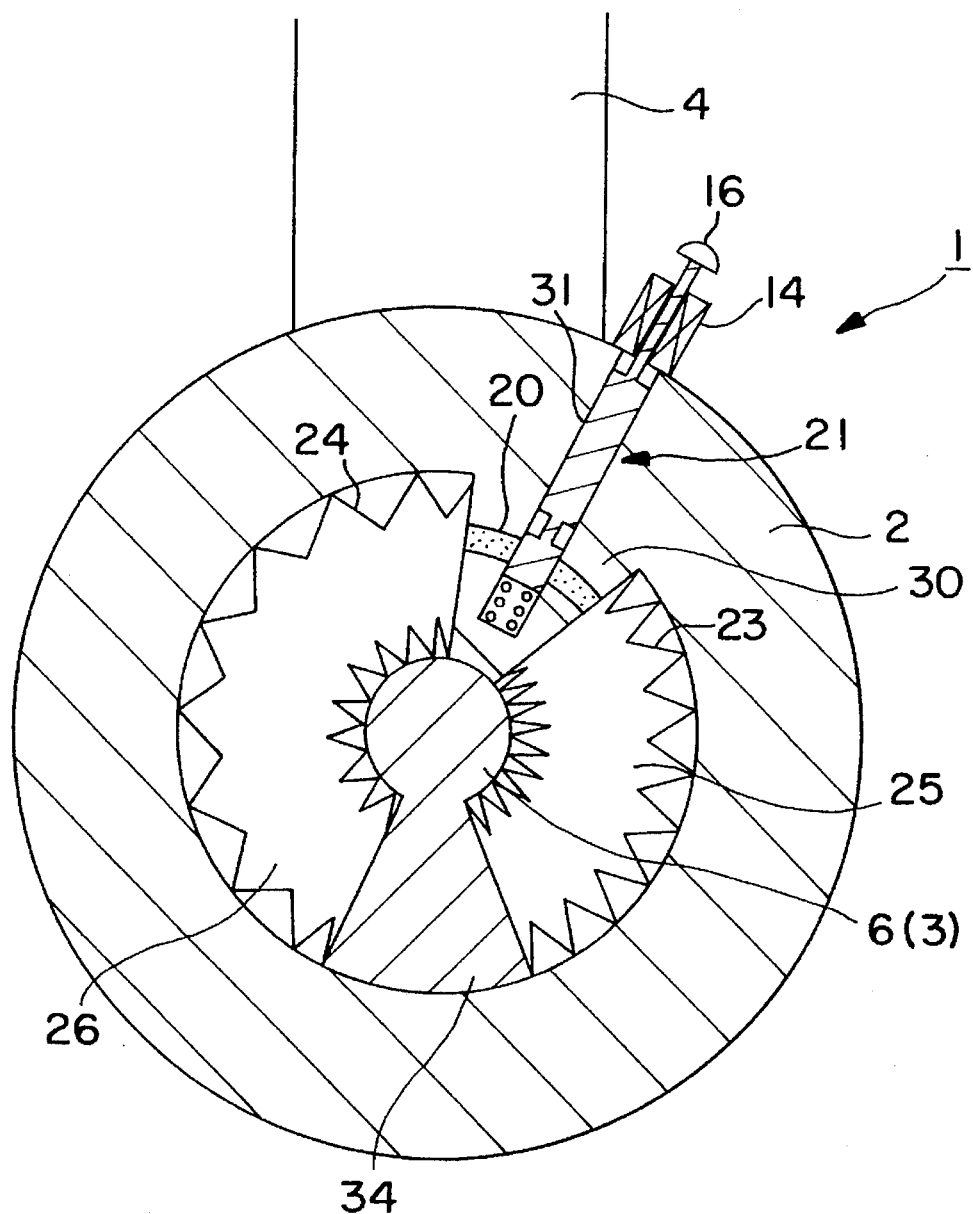
FIG. 8 is a sectional view of the articulation mechanism of the second embodiment of the present invention.
Figure 9:
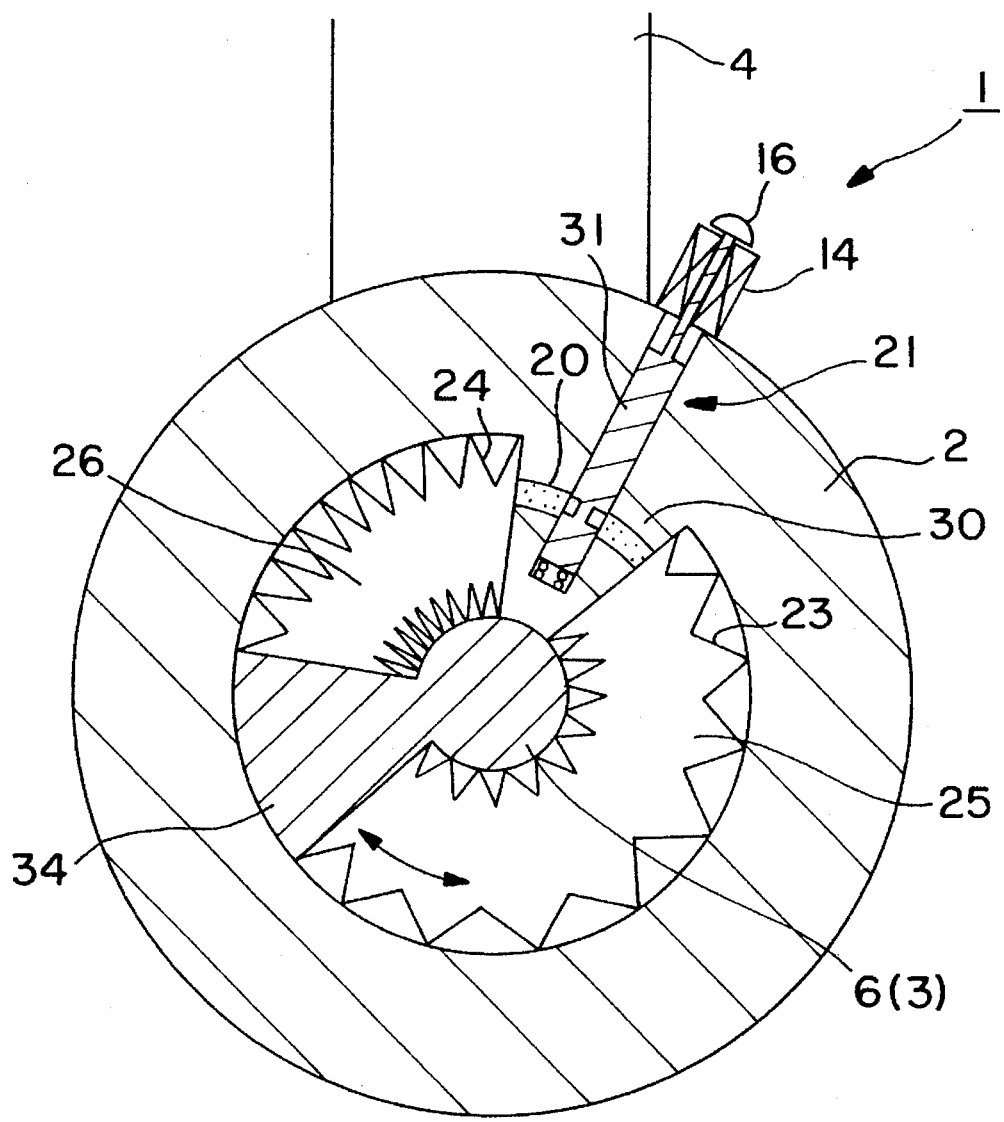
FIG. 9 is a sectional view of the operation of the embodiment shown in FIG. 8.

To a predetermined position (local portion) around the hole 7 in the first rotary member 2 a partitioning piece 30 which is projecting inwardly is connected and secured. This partitioning piece 30 is the first member. The second rotary member 3 includes the central axis 6, and at its predetermined position (local portion) there is connected and secured a rotating piece 34, so that by combining the first rotary member 2 with the second rotary member 3, both of them rotate relatively and relative distance between the local portions changes. The present articulation mechanism is adapted as described the above. In this embodiment between one side of the partitioning piece 30, i.e., the first member, and one side of the rotating piece 34 there is provided bellows means 23 in which a fluid can be sealed, and also between the other side of the partitioning piece 30 and the other side of the rotating piece 34 there is alsoprovided bellows means 24 which serves as the former does. In FIGS. 8 and 9 there are shown sectioned views of the articulation mechanism. Though not shown in FIGS. 6 and 7 to the partitioning piece 30 there is provided the opening and closing valve means 21 having a spool valve 31 so that the first rotary member 2 may be penetrated, and the valve means 21 is adapted to be able to open and close the communicating passage which penetrates the partitioning piece 30 by operating electromagnetic driving means 14 or the button 16.

The communicating passage 20 communicates with each of the insides of the both bellows means 23 and 24 of the both sides of the partitioning piece 30. As can be clearly understood, the first partitioning chamber 25 is defined with the one side of the rotating piece 34, one side of the partitioning piece 30 and the bellows 23 provided between them, and the second partitioning chamber 26 is formed by the other side of the rotating piece 34, the other side of the partioning piece 30 and the bellows 24 provided between them. These partitioning chambers 25 and 26 are filled with such fluids as liquid or gas having non-compressive property same as the case of the first embodiment. As described the above, if the opening and closing valve means 21 is opened by operating the external switching means 11 or the push button 16 etc., the articulation mechanism 1 can be freely rotated through the arms 4 and 5. In the case of stopping movement of the articlation mechanism 1, the external switching means 11 is turned off or the push button 16 etc. is manually operated. Then, flowing of the fluid between the both partitioning chambers is prevented, therefore, the fluid is hermetically sealed in the both partitioning chambers 25 and 26 which results in stopping movement of the rotating piece 34 immediately (FIGS. 8 and 9). Accordingly, if liquid or the like is used, even if strong bending force is applied to the arms 4 or 5, the articulation mechanism 1 according to the present invention does not operate. As described the above, if bellows means or the like are applied as those of the first and the second embodiments, there is a further advantage of extremely reducing leakage of the fluid in comparison with the case in which a piston, cylinder or the like is being used. In addition, the present articulation mechanism can also be applied horizontally. In such a case as shown in the embodiment in FIG. 5, the arms 4 and 5 are vertically secured to the first rotary member 2 and the second rotary member 3, respectively.

Figure 10:
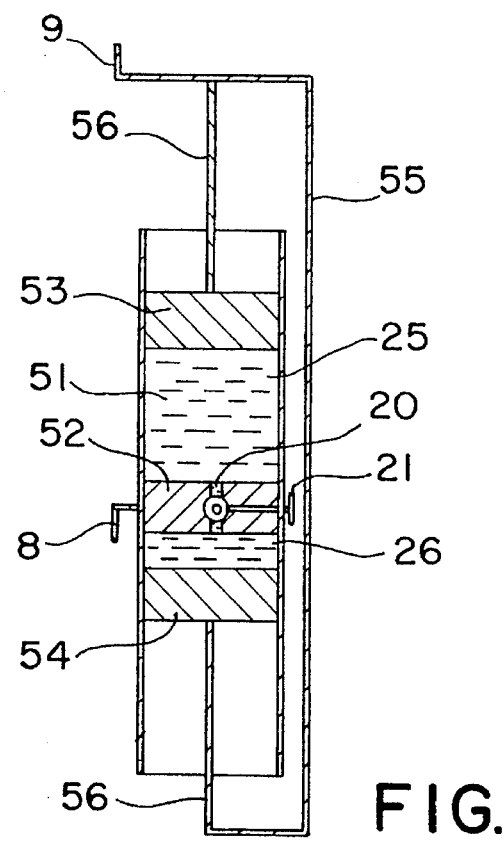
FIG. 10 is a schematic view showing the third embodiment of the articulation mechanism according to the present invention.

In FIG. 10 there is shown a sketch of the third embodiment of the articulation mechanism according to the present invention which corresponds to the first embodiment shown in FIG. 3. In this embodiment no bellows means is used, but piston-cylinder unit is used. A first member is constructed in the inside of a cylinder 51 by securing a partitioning plate to the inside thereof, for example, by means of welding etc., and in the predetermined portion of the cylinder 51 there is secured the hinge 8. Further, in the partitioning plate 52 there is bored the communicating passage 20 throuh which the upper part and the lower part is communicated. Same as those other embodiments, the communicating passage 20 can be opened and closed by the opening and closing valve 21.

In the inner side of the cylinder 51 there are provided two pistons 53 and 54 which move slidingly in the inside of the cylinder 51 by maintaining hermetical sealing condition thereof with an O ring or the like. From each of these pistons 53 and 54 respective rods 56, 56 extend to a connecting rod 55 to connect securedly with it. That is, they construct the second member, and to one of the end of the rod 56, same as other embodiments, the hinge means 9 is securedly provided.

Figure 11:
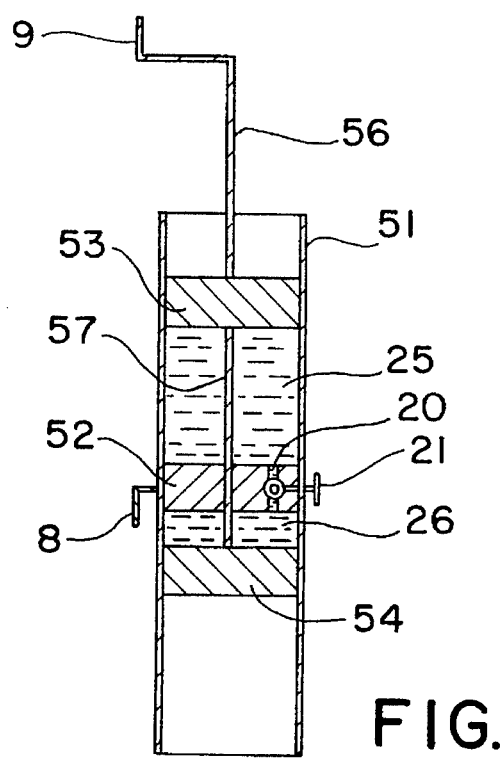
FIG. 11 is a schematic view showing the fourth embodiment of the articulation mechanism according to the present invention.

In this embodiment, same as in the first embodiment, the first partitioning chamber 25 and the second partitioning chamber 26 are provided, and in these partitioning chambers liquids having non-compressive property (silicone oil, water, machine oil etc.) are hermetically sealed, and predetermined gaseos bodies may be also pressedly injected. In FIG. 11 there is shown the fourth embodiment of the present invention. This embodiment differs from the third embodiment in the following respect that the pistons 53 and 54 are connected with each other through a connecting rod 57 which penetrates the partitioning plate 52 in the inner side of the cylinder 51. The connecting rod 57 slidably moves up and down in the cylinder 51 by maintaining hermetically sealed condition to the partitioning plate 52.

Figure 12:
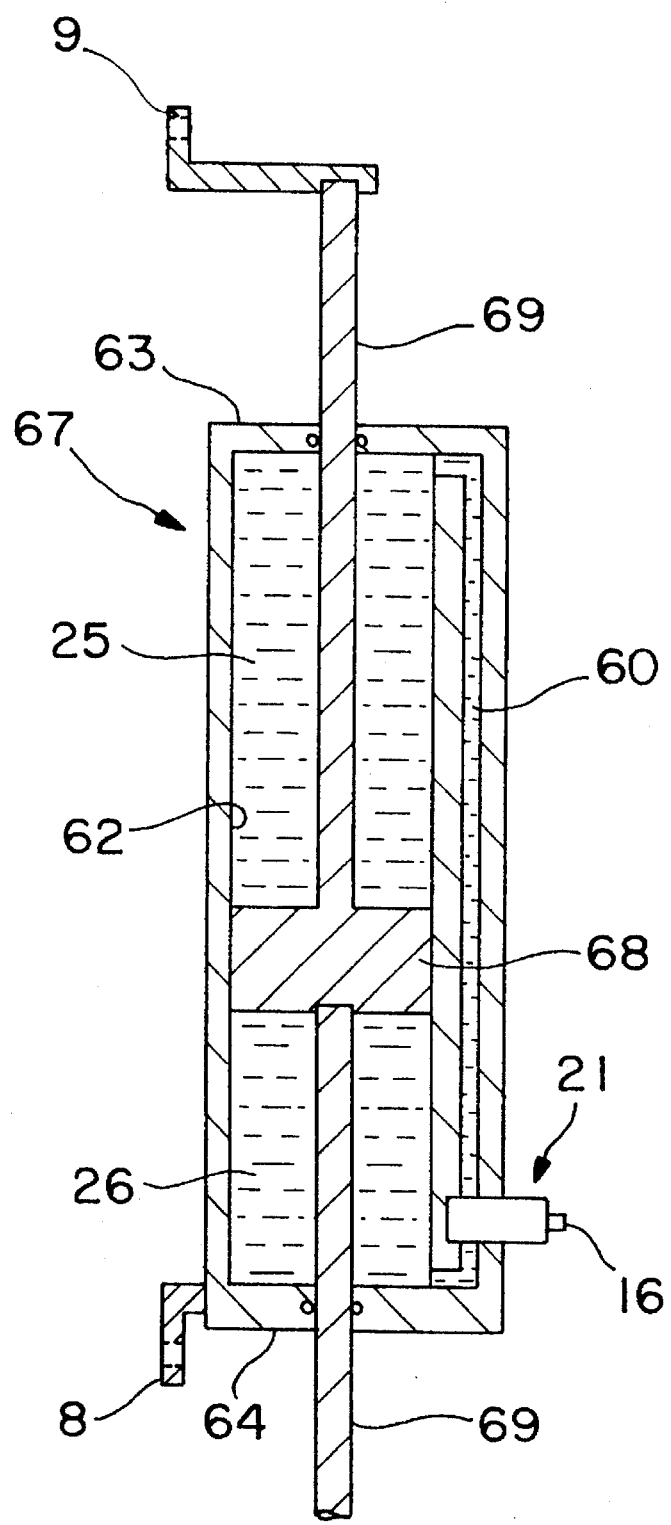
FIG. 12 is a sectional view showing the fifth embodiment of the articulation mechanism according to the present invention.

In FIG. 12 there is shown the fifth embodiment of the present invention which corresponds to the first embodiment shown in FIG. 3. In this embodiment a sealed cylinder 67 having linear shape is pivotally secured to the first rotary member 2. In the inside of a cylinder chamber 62 of the cylinder 67 the piston 68 is slidably provided, and piston rods 69, 69 extended from the piston 68 project outwardly by penetrating both ends of the sealed cylinder 67. At least one of tip ends of the piston rod is pivoted to the second rotary member 3 by the hinge means 9 or the like. Here, cross section of one of the piston rods 69 is same as that of the other piston rod 69.

Figure 13:
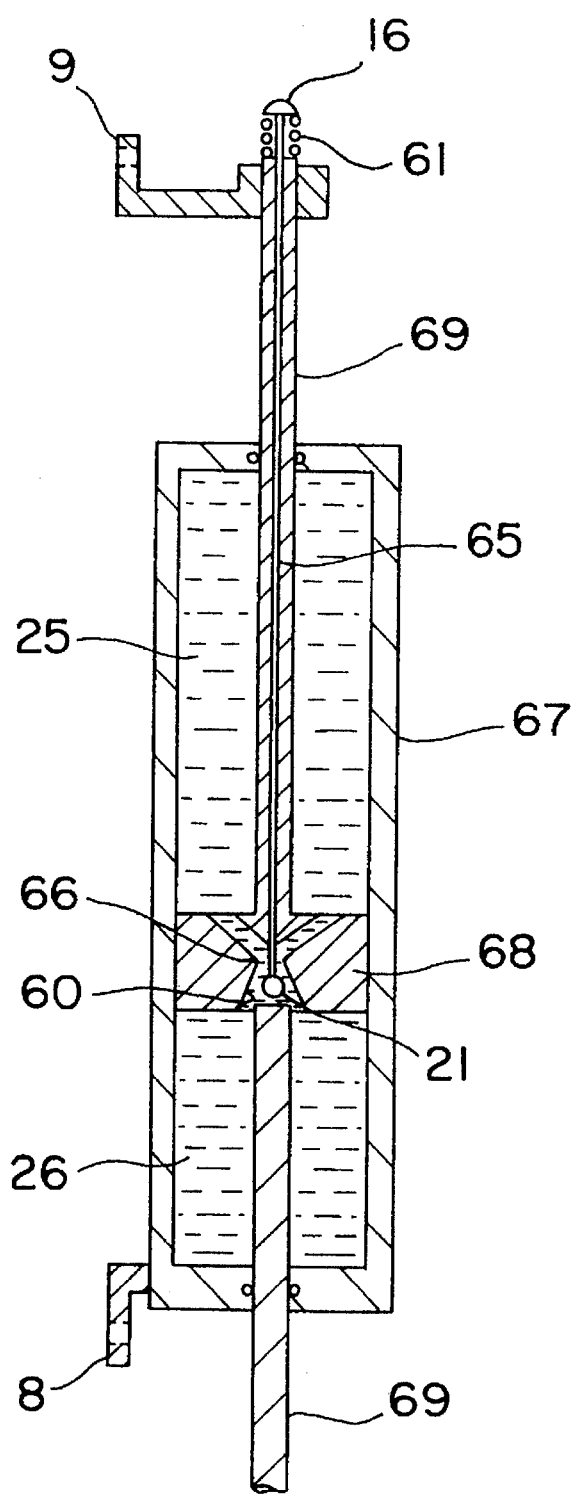
FIG. 13 is a sectional view showing the sixth embodiment of the articulation mechanism according to the present invention.
Figure 14:
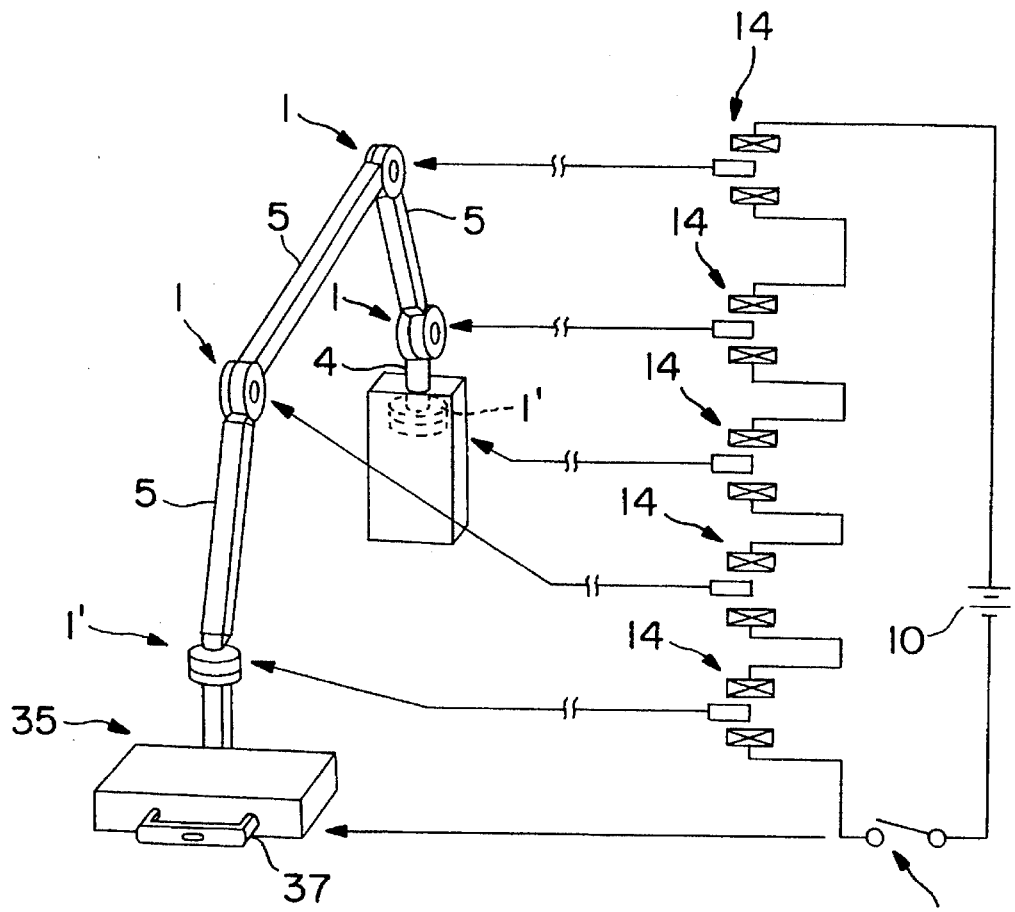
FIG. 14 is a perspective view of a unversal arm means of the present invention.

The cylinder 67 has a communicating passage 60 extends to both of the end portions 63 and 64 of the cylinder 67 so that the first partitioning chamber 25 and the second partitioning chamber 26 can be communicated with each other excepting the cylinder chamber 62. At a predetermined portion in the communicating passage 60 which communicates the first partitioning chamber 25 with the second partitioning chamber 26 there is provided the opening and closing valve 21. The opening and closing valve 21 is in a closed state in usual condition by energizing means such as spring etc., and by pushing the button 16 which extends to the head portion as operating means, the valve 21 is opened so that both insides of the partitioning chambers 25 and 26 may communicate with each other. In the drawings the communicating passage 60 is displayed as a part of the cylinder 67, however, it is apparent that the communicating passage 60 can be replaced with a slender pipe. In addition, as the opening and closing valve 21, for example, an electromagnetic valve which is in usual state being closed can be applied, and the push button 16 can be mounted on the electromagnetic valve additionally so that it may be used only in manually operating time. In the inside of the linear shaped cyliner 67 is divided into two chambers, i.e., to the first partitioning chamber 25 and the partitioning chamber 26 in each of which a liquid is sealingly filled. FIG. 13 shows the sixth embodiment of the present invention which corresponds to that of shown in FIG. 12. In this embodiment an opening and closing member is provided in the piston part. As shown in FIG. 13, in the inside of the piston 68 the communicating passage 60 having a valve seat 66 is formed. The opening and closing valve 21 is contacted with the valve seat 66 by urging with a spring 61, and further to the valve 21 one end of a pushing rod 65 as an operating member which can move in the inside of the piston rod 69. With the movement of this pushing rod 65, the valve 21 can be removed from the valve seat 66. The other end of the pushing rod 65 extends to the outside of the hinge 9 to connect with the push button 16. In FIG. 14 there is shown an embodiment of a universal mechanism applying the articulation mechanism 1 and 1'. In this embodiment a mounting stand 35 is installed at the moving tip end of the universal mechanism.

In this state the universal mechanism can not move if any weighty thing is placed thereon, even if the arms 4 and 5 are pushed. However, by lightly pushing the external switching means 11 mounted on a grasping portion 37 shown in FIG. 15, the whole electromagnetic driving means 14 are actuated to enable each of the articulation mechanism 1, 1' to shift, and by keeping the grasping portion 37 to a grasped state, a weighty things can be conveyed to any desired place.

However, regarding the articulation mechanism 1, if such as spring means is arranged so as to energize the mounting stand 35 to move in the upper direction, the articulation mechanism 1 can balance weight of the weighty thing with By letting release an operator's hand from the grasping portion 37, the universal arm mechanism can be completely stopped at the position.

Figure 15:
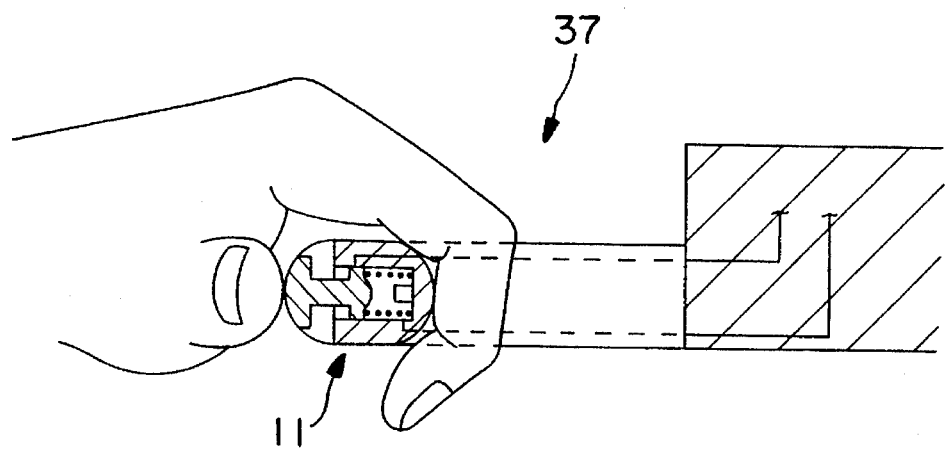
FIG. 15 is a sectional view of a holding portion shown in FIG. 12.
Figure 16:
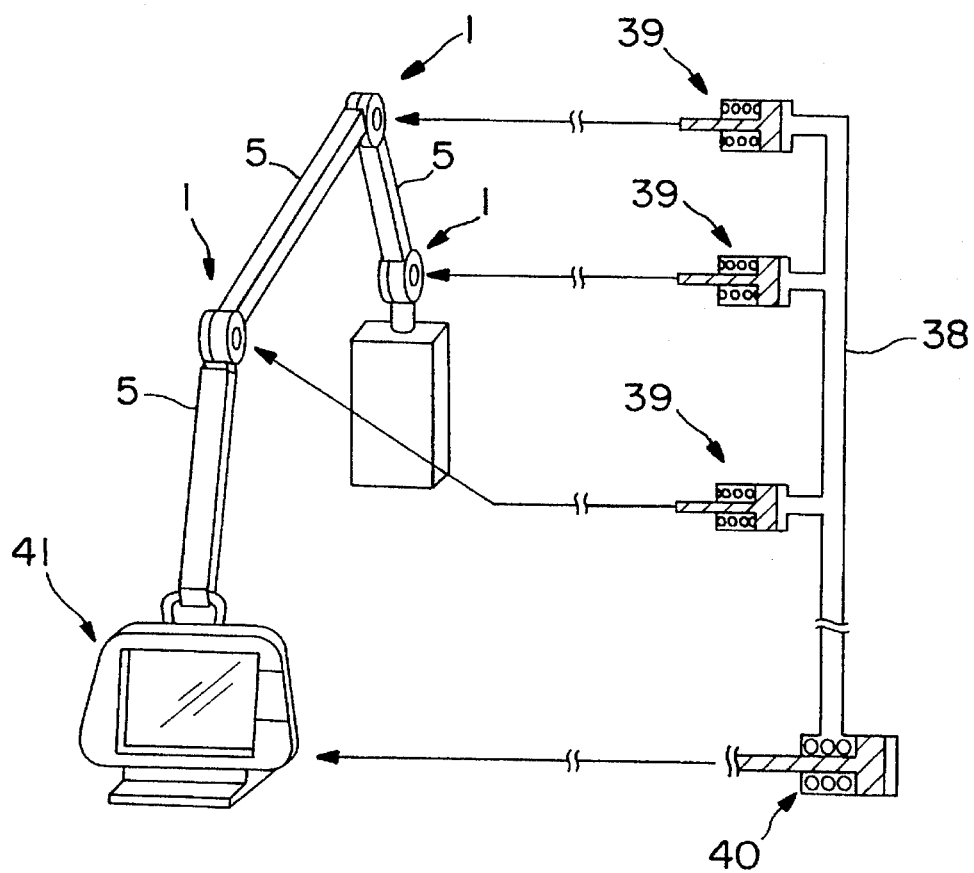
FIG. 16 is a perspective view of another embodiment of the universal arm means of the present invention.
Figure 17:
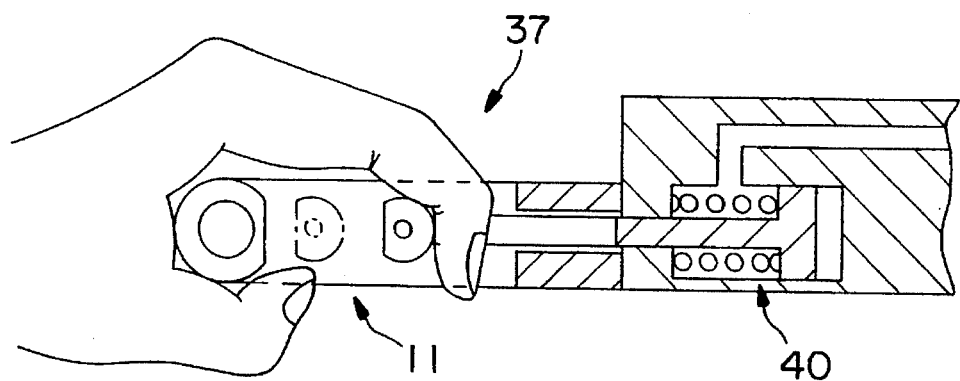
FIG. 17 is a sectional view of the holding portion shown in FIG. 11.

Further, since the grasping portion 37 is grasped by the operator, the mounting stand 35 can be held at any desired horizontal state. Of course, it is possible to apply parallel link mechanism to the present articulation mechanism, when it is desired to keep surely any desired horizontal state. In FIGS. 15 and 16 there is shown another embodiment of the universal arm mechanism in which instead of the electromagnetic driving means 14, hydraulic means such as using liquid, fluid etc. which operates the articulation mechanism 1 at a stroke is provided, and a pipe 38 is disposed at predetermined positions of the arms 4 and 5. At the position where the electromagnetic driving means 14 is to be disposed in other embodiments, a fluid feeding out piston cylinder 40 which serves as an external switching means is provided to the grasping portion 37. At the tip end of the universal arm mechanism, for example, a television set or the like is suspended by means of usual hinge means. In such a case, even if the arms move freely, it is adapted that the suspended television set always faces to the front. In the case of this embodiment same as other cases, when the operator takes his hand off from the external switching means 11, the movements of the arms stop at their positions simultaneously. Accordingly, though there is only a narrow floor space, if the base portion of the universal arm mechanism is installed at an appropriate wall or on the floor, it is possible to shift the television set or CRT screen in the vicinity of a working desk when they are being used and when they are not being used can be shifted in the neighbour of the wall or the ceiling. Thus, convenience can be greatly increased.

In this mechanism until the grasping portion is touched by the hand of the operator, the arms do not move at all. In the case of changing an inclining angle of the arm(s), by pushing the push button 16 provided to each of the articulation mechanism 1, any of the articulation mechanism which is desired to move can be rotated individually and can adjust its position. The present invention is not limited to the embodiments heretofore described, but in the present invention there are further modifications in which, for example, tension wire means etc. are applied instead of using the electromagnetic driving means 14 or the piston cylinders 39 and 40 so that the opening and closing valve means 21 can be mechanically operated. In the embodiment between the rotary members there is provided the spring means 28, it can be replaced with gas spring means or magnetic means to energize the means to rotate. In the case of the load being small and the articulation mechanism being used as suspending means, energizing means can be omitted. In the case of being insufficient in energizing power to the upward, spring means such as having been used to connect ajacent arms with each other, for example, in an articulating desk light (Z light) can be provided to the universal arm mechanism for increasing upward energizing power. Further, if the articulation mechanism 1 and 1' are appropriately combined, a universal arm mechanism having higher performance can be manufactured. If the communicating passage 20 is made narrow, the fluid or liquid can not flow rapidly, so that even if any energizing means is destroyed, or the valve 21 does not operate, the weighty thing being suspended lowers slowly so that one can be prevented from unexpected dangers. Especially, as shown in the embodiments, since the first and the second members and the liquid sealing space move in an area having smaller diameter that those of the two rotary members, there is no troublesome projection between the arms, so that it is possible to coverthis portion easily by a cover. The present invention has been described basing on the embodiemtns with reference to the drawings, however, concrete construction of the present invention is never limited to these embodiments, but without departing from the spirit and scope of the invention various modifications and additional constructions can be realized.

Merits of the Invention

The present invention achieves the following merits.

The articulation mechanism according to the present invention is provided with the liquid sealing space in the inside of which a non-compressive fluid or a compressed fluid compressed to a predetermined pressure is filled, so that even if there is any energizing force, relatve rotations of the rotary members are prevented by predetermined force. In the case of releasing hermetically sealed condition of the the fluid by the opening and closing means, by means of energizing force of load or spring means the fluid can move freely, and with this movement the relative rotations of the rotary members are prevented.

In this universal arm mechanism a plurality of articulation mechanism are disposed among a plurality of arms, and each of the opening and closing means of these articulation mechanism can be simultaneously operaated by the external switching means, accordingly, with "on" state of the external switching means the universal arms can be freely controlled, and with "off" state of the switching means the universal arms can be stationary secured.

Description of Reference Number 1, 1.' articulation mechanism
2. the first rotary memebr
3. the second rotary member
4. arm
5. arm
6. central axis
7. bore
8. hinge
9. hinge
10. electric power source
11. external switching means
14. electromagnetic driving means
15. projecting piece
16. button (operating part)
17. disk (the first member)
18. rod (the second member)
19, 19' end disk (the second memebr)
20. communicating passage
21. opening and closing valve(opening and closing means)
22. bore portion
23. bellows
24. bellows
25. the first partitioning chamber (fluid hermetically seald space)
26. the second partitioning chamber
27. projecting piece
28. spring (energizing means)
29. groove
30. partitioning piece(the first member)
31. spool valve
32. bore
33. securing screw
34. pivotal piece (the second member)
35. mounting stand
37. grasping portion
38. pipe
39. piston cylinder
40. piston cylinder
41. television set
42. cap plate
43. guiding piece
51. cylinder(the first member)
52. partitioning plate (the first member)
53. piston (the second member)
54. piston (the second member)
55. connecting rod (the second member)
56. rod (the second member)
57. connecting rod(the second member)
60. communicating passage (hole)
61. spring (means)
62. cylinder chamber
63. end portion
64. end portion
65. push rod
66. valve seat
67. cylinder(the first member)
68. piston(the second member)
69. piston rod (the second member)

I claim:
1. Articulation mechanism comprising:
at least two rotary members which rotate relatively;

a first portion freely selected on one of said rotary members and a second portion freely selected on another of said rotary members, wherein each of said portions changes relative to the distance between them and each of said rotary members based on said relative rotation of said rotary members;

a first member and a second member each of which is connected with the first portion and the second portion respectively, and a fluid hermetically sealing space formed between the first member and the second member; wherein said fluid sealing space is adapted to be able to release said hermetically sealing condition of a fluid which is sealed therein with predetermined opening and closing means, characterized in that:

the first member and the second member are pivotally secured respectively to the first and second rotary members by hinge means.

2. The articulation mechanism according to claim 1, wherein said fluid hermetically sealing space is partitioned into at least two parts with partitioning means, said fluid sealed in said partitioned space does not flow to the outside, but can flow in said partitioned parts only by means of said opening and closing means, and said fluid hermetically sealed space is adapted to have constant volume when said fluid is transferred between said partitioned parts.

3. The articulation mechanism according to claim 1, wherein said fluid hermetically sealing space is constructed by a piston and cylinder.

4. The articulation mechanism according to claim 1, wherein said fluid hermetically sealing space is made with bellows.

5. The articulation mechanism according to claim 1, wherein the first member and the second member are provided with mutually slidable guiding means.

6. The articulation mechanism according to claim 2, wherein said fluid hermetically sealing space is constructed by a piston and cylinder.

7. The articulation mechanism according to claim 2, wherein said fluid hermetically sealing space is made with bellows.

8. A universal arm mechanism characterized by comprising:

a plurality of arms; and a plurality of articulation mechanism each having at least two rotary members which rotate relatively, a first portion freely selected on one of said rotary members and a second portion freely selected on another of said rotary members each of said portions changes relative to the distance between them and each of said rotary members based on said relative rotation of said rotary members, a first member and a second member each of which is connected with the first portion and the second portion respectively, and a fluid hermetically sealing space formed between the first member and the second member, wherein said sealing space is adapted to be able to release said hermetically sealing condition of fluid which is sealed therein with predetermined opening and closing means;

wherein each of said articulation mechanism is provided between each of adjacent arms of said plurality of arms;

wherein opening and closing means of said plurality of articulation mechanism can be controlled to make opening and closing movements simultaneously by one external switching means.

9. The universal arm mechanism according to claim 8, wherein energizing means pushes up vertically the tip end of said arm of said universal arm mechanism when said opening and closing means of said articulation mechanism is released.

* * * * *